US011912071B2

United States Patent
Saeki

(10) Patent No.: US 11,912,071 B2
(45) Date of Patent: Feb. 27, 2024

(54) TIRE

(71) Applicant: BRIDGESTONE CORPORATION, Tokyo (JP)

(72) Inventor: Junichi Saeki, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 436 days.

(21) Appl. No.: 17/293,081

(22) PCT Filed: Nov. 14, 2019

(86) PCT No.: PCT/JP2019/044696
§ 371 (c)(1),
(2) Date: May 12, 2021

(87) PCT Pub. No.: WO2020/100978
PCT Pub. Date: May 22, 2020

(65) Prior Publication Data
US 2021/0394563 A1 Dec. 23, 2021

(30) Foreign Application Priority Data
Nov. 14, 2018 (JP) ................................ 2018-213940

(51) Int. Cl.
*B60C 15/00* (2006.01)
*B60C 11/01* (2006.01)
*B60C 13/00* (2006.01)

(52) U.S. Cl.
CPC .............. *B60C 13/00* (2013.01); *B60C 11/01* (2013.01); *B60C 15/0036* (2013.01); *B60C 2013/007* (2013.01); *B60C 2015/009* (2013.01)

(58) Field of Classification Search
CPC ......... B60C 15/0036; B60C 2015/009; B60C 11/01
See application file for complete search history.

(56) References Cited

U.S. PATENT DOCUMENTS 3,961,657 A 6/1976 Chrobak
5,674,331 A 10/1997 Saeki et al.
(Continued)

FOREIGN PATENT DOCUMENTS

CN 102712219 A 10/2012
CN 203142299 U 8/2013
(Continued)

OTHER PUBLICATIONS

Machine Translation: JP-2002331807-A, Watanabe S, (Year: 2023).*
(Continued)

*Primary Examiner* — Kendra Ly
(74) *Attorney, Agent, or Firm* — Sughrue Mion, PLLC

(57) ABSTRACT

In one aspect of a tire (10) of the present invention, a plurality of carcass plies (50a) include a first carcass ply (51). A first end portion (51a), which is a distal end portion of a portion of the first carcass ply folded around the bead core, is located outside in a tire radial direction from a position (WL) where a dimension in a tire width direction is maximum, and is located at a boundary portion (14) between a tread portion (11) and a sidewall portion (12), and in the portion located outside in the tire radial direction from the position where the dimension in the tire width direction is maximum, a dimension (T5) in a tire thickness direction between the portion of the first carcass ply folded around the bead core and an outer surface (12a) of the tire in the tire width direction is maximum between the first end portion and the outer surface of the tire in the tire width direction.

14 Claims, 2 Drawing Sheets

(56) References Cited

U.S. PATENT DOCUMENTS

| | | | |
|---|---|---|---|
| 6,296,031 | B1 | 10/2001 | Noji |
| 7,677,288 | B2 | 3/2010 | Ikegami |
| 2005/0016653 | A1* | 1/2005 | Kajita .................. B60C 9/0207 |
| | | | 152/451 |
| 2008/0006359 | A1 | 1/2008 | Yamashita |
| 2012/0247638 | A1 | 10/2012 | Inoue |
| 2014/0373995 | A1 | 12/2014 | Handlos et al. |
| 2015/0165832 | A1 | 6/2015 | Orlowski |
| 2016/0059637 | A1 | 3/2016 | Shimomura |

FOREIGN PATENT DOCUMENTS

| | | | | |
|---|---|---|---|---|
| CN | 107415599 A | | 12/2017 | |
| FR | 2866829 A1 | | 9/2005 | |
| JP | 60038211 A | * | 2/1985 | ............ B60C 11/01 |
| JP | 05-319032 A | | 12/1993 | |
| JP | 06032120 A | * | 2/1994 | |
| JP | 06-143915 A | | 5/1994 | |
| JP | 8-244420 A | | 9/1996 | |
| JP | 11-348514 A | | 12/1999 | |
| JP | 2000-185531 A | | 7/2000 | |
| JP | 2002-200904 A | | 7/2002 | |
| JP | 2002-331807 A | | 11/2002 | |
| JP | 2002331807 A | * | 11/2002 | |
| JP | 2003-170710 A | | 6/2003 | |
| JP | 2005059802 A | * | 3/2005 | |
| JP | 2006-347394 A | | 12/2006 | |
| JP | 2007176439 A | * | 7/2007 | ............ B60C 5/142 |
| JP | 2008-1328 A | | 1/2008 | |
| JP | 2008055962 A | * | 3/2008 | |
| JP | 2008-174057 A | | 7/2008 | |
| JP | 2010-132235 A | | 6/2010 | |
| JP | 2010-228646 A | | 10/2010 | |
| JP | 2015-20499 A | | 2/2015 | |
| JP | 2015-150895 A | | 8/2015 | |
| JP | 2016-43869 A | | 4/2016 | |

OTHER PUBLICATIONS

Machine Translation: JP-60038211-A, Kakumaru K, (Year: 2023).*
Machine Translation: JP-2007176439-A, Takao M (Year: 2023).*
Machine Translation: JP-2008055962-A, Bandai A (Year: 2023).*
Machine Translation: JP-2005059802-A, Okada T, (Year: 2023).*
Machine Translation: JP-06032120-A, Kojima H, (Year: 2023).*
International Search Report for PCT/JP2019/044696 dated, Jan. 28, 2020 (PCT/ISA/210).
Search Report dated Jun. 22, 2022 from the China National Intellectual Property Administration in CN Application No. 201980074234.1.
Extended European Search Report dated Jul. 5, 2022 from the European Patent Office in EP Application No. 19885996.9.

* cited by examiner

TIRE

CROSS REFERENCE TO RELATED APPLICATIONS

This application is a National Stage of International Application No. PCT/JP2019/044696 filed Nov. 14, 2019, claiming priority based on Japanese Patent Application No. 2018-213940 filed Nov. 14, 2018.

TECHNICAL FIELD

The present invention relates to a tire.
Priority is claimed on Japanese Patent Application No. 2018-213940, filed on Nov. 14, 2018, the content of which is incorporated herein by reference.

BACKGROUND ART

A tire including a carcass layer having a plurality of laminated carcass plies is known. For example, Patent Document 1 describes a configuration in which two carcass plies are laminated.

CITATION LIST

Patent Document

Patent Document 1

Japanese Unexamined Patent Application, First Publication No. 2015-20499

SUMMARY OF INVENTION

Technical Problem

In the above tire, in order to suppress occurrence of side cut that cuts a sidewall portion, it is conceivable to dispose a tire radial position of an end portion of a carcass ply folded around a bead core at an outer side to improve strength of the sidewall portion.

However, stress is likely to be concentrated when an external force is applied to a tire at the end portion of the carcass ply, and the tire is easily distorted. Therefore, simply disposing the end portion of the carcass ply on the outside in a tire radial direction may increase strain of the tire when a vehicle travels. Accordingly, durability of the tire may decrease.

In view of the above circumstances, one aspect of the present invention is to provide a tire having a structure capable of suppressing the decrease in the durability while suppressing the occurrence of the side cut.

Solution to Problem

In one aspect of the tire of the present invention, there is provided a tire including: a carcass layer which is provided across a tread portion, a pair of sidewall portions, and a pair of bead portions, wherein the carcass layer has a plurality of laminated carcass plies, the plurality of carcass plies include a first carcass ply which extend from the tread portion to the pair of bead portions via the pair of sidewall portions and is folded outward in a tire width direction around a bead core embedded in the bead portion, a first end portion, which is a distal end portion of a portion of the first carcass ply folded around the bead core, is located outside in a tire radial direction from a position where a dimension in the tire width direction is maximum, and is located at a boundary portion between the tread portion and the sidewall portion, and in a portion located outside in the tire radial direction from the position where the dimension in the tire width direction is maximum, a dimension in a tire thickness direction between the portion of the first carcass ply folded around the bead core and an outer surface of the tire in the tire width direction is maximum between the first end portion and the outer surface of the tire in the tire width direction.

Advantageous Effects of Invention

According to one aspect of the present invention, there is provided a tire having a structure capable of suppressing a decrease in durability while suppressing occurrence of side cut.

DESCRIPTION OF EMBODIMENTS

Hereinafter, a tire according to an embodiment of the present invention will be described with reference to the drawings. A scope of the present invention is not limited to the following embodiment, and can be arbitrarily changed within a scope of a technical idea of the present invention. Further, in the following drawings, a scale and a number of each structure may be different from a scale and a number of an actual structure in order to make each configuration easy to understand.

In each drawing, a right-left direction is a tire width direction. In each drawing, an up-down direction is a tire radial direction. In the following descriptions, for a certain object, a side closer to a tire equatorial section CL in the tire width direction is referred to as an "inside in the tire width direction", and a side far from the tire equatorial section CL in the tire width direction is referred to as an "outside in the tire width direction". The tire equatorial section CL is a center in the tire width direction of a tire 10 of the present embodiment. Further, in the portion of the tire 10 illustrated in each drawing, an upper side of each drawing is an outside in the tire radial direction, and a lower side of each drawing is an inside in the tire radial direction. Further, a circumferential direction of the tire 10 around a central axis (not illustrated) is referred to as a tire circumferential direction.

Figure 1:
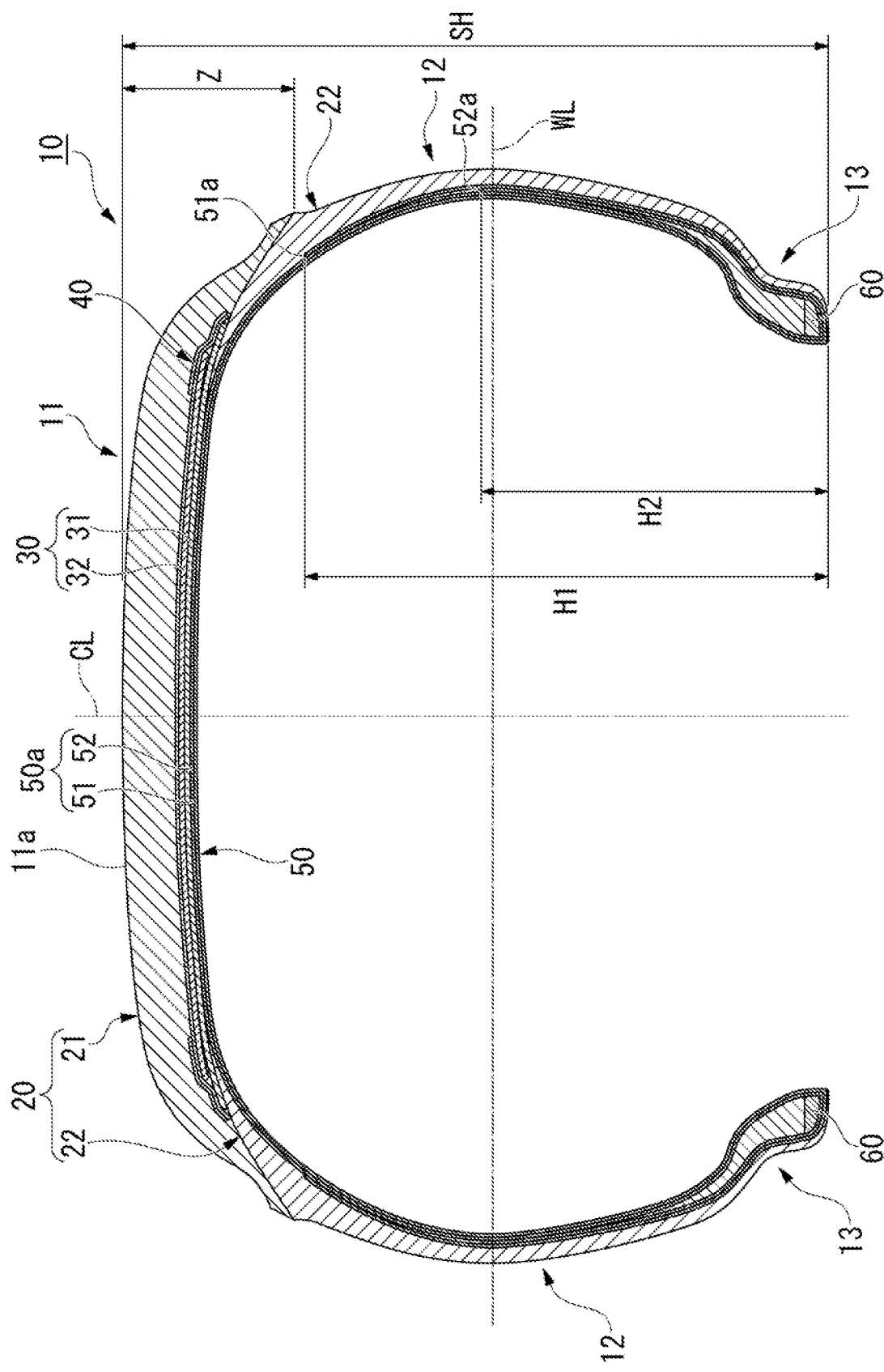
FIG. 1 is a cross-sectional view illustrating a portion of a tire of the present embodiment, and is a cross-sectional view taken along a tire width direction.

For example, the tire 10 of the present embodiment is a tire for a sports utility vehicle (SUV). As illustrated in FIG. 1, the tire 10 includes a tread portion 11, a pair of sidewall portions 12, and a pair of bead portions 13.

The tread portion 11 is disposed outside from the pair of bead portions 13 in the tire radial direction, and is located at an outer end portion of the tire 10 in the tire radial direction. The tread portion 11 has an annular shape extending in the tire circumferential direction. The tread portion 11 has a tread surface portion 11a which is a ground contact surface of the tire 10. The tread surface portion 11a is a portion of an outer surface of the tread portion 11 in the tire radial direction.

For example, the tread surface portion 11a is the ground contact surface of the tread portion 11 in a state where the tire 10 is mounted on a standard rim specified in "JATMA Year Book", and the tire 10 is filled with the internal pressure (hereinafter, referred to as a specified internal pressure) of 100% of an air pressure (maximum air pressure) corresponding to a maximum load capacity (internal pressure—bold load of load capacity correspondence table) in an applicable size and ply rating in "JATMA Year Book" such that a maximum load corresponding to the maximum load capacity is applied.

For example, when a region where the tire 10 is produced or used is other than Japan, the tread surface portion 11a is the ground contact surface of the tread portion 11 in a state where the tire 10 is based on an industrial standard (for example, "TRA Year Book" in the United States, "ETRTO Standard Manual" in Europe, or the like) applied to the region other than Japan.

The pair of sidewall portions 12 extends inward in the tire radial direction from both end portions of the tread portion 11 in the tire width direction. The pair of sidewall portions 12 connects both end portions of the tread portion 11 in the tire width direction and the pair of bead portions 13, respectively.

The pair of bead portions 13 is connected to inner end portions of the pair of sidewall portions 12 in the tire radial direction, respectively. A bead core 60 is embedded in each of the pair of bead portions 13.

The tire 10 includes a carcass layer 50 which serves as a skeleton. The tire 10 is configured by assembling a tire body 20, a belt layer 30, and a belt reinforcing layer 40 to the carcass layer 50. The carcass layer 50 is provided so as to straddle the tread portion 11, the sidewall portion 12, and the bead portion 13. The carcass layer 50 has an annular shape extending along the tire circumferential direction. The carcass layer 50 will be described in detail below.

The tire body 20 has a tread rubber 21 and a pair of sidewall rubbers 22.

The tread rubber 21 is a portion forming a portion of the tread portion 11, and has an annular shape extending along the tire circumferential direction. The tread rubber 21 is provided on the outer side of the carcass layer 50 in the tire radial direction.

The sidewall rubber 22 is a portion forming a portion of the sidewall portion 12 and a portion of the bead portion 13, and has an annular shape extending along the tire circumferential direction. The pair of sidewall rubbers 22 is provided on both sides of the carcass layer 50 in the tire width direction. Outer end portions of the pair of sidewall rubbers 22 in the tire radial direction are connected to both end portions of the tread rubber 21 in the tire width direction and are connected to each other.

The belt layer 30 is embedded in the tread portion 11. The belt layer 30 is laminated on the outer side of the carcass layer 50 in the tire radial direction. The belt layer 30 is located between the tread surface portion 11a which is the ground contact surface of the tread portion 11, and the carcass layer 50 in the tire radial direction. In the present embodiment, the belt layer 30 has two laminated belt plies 31 and 32.

Figure 2:
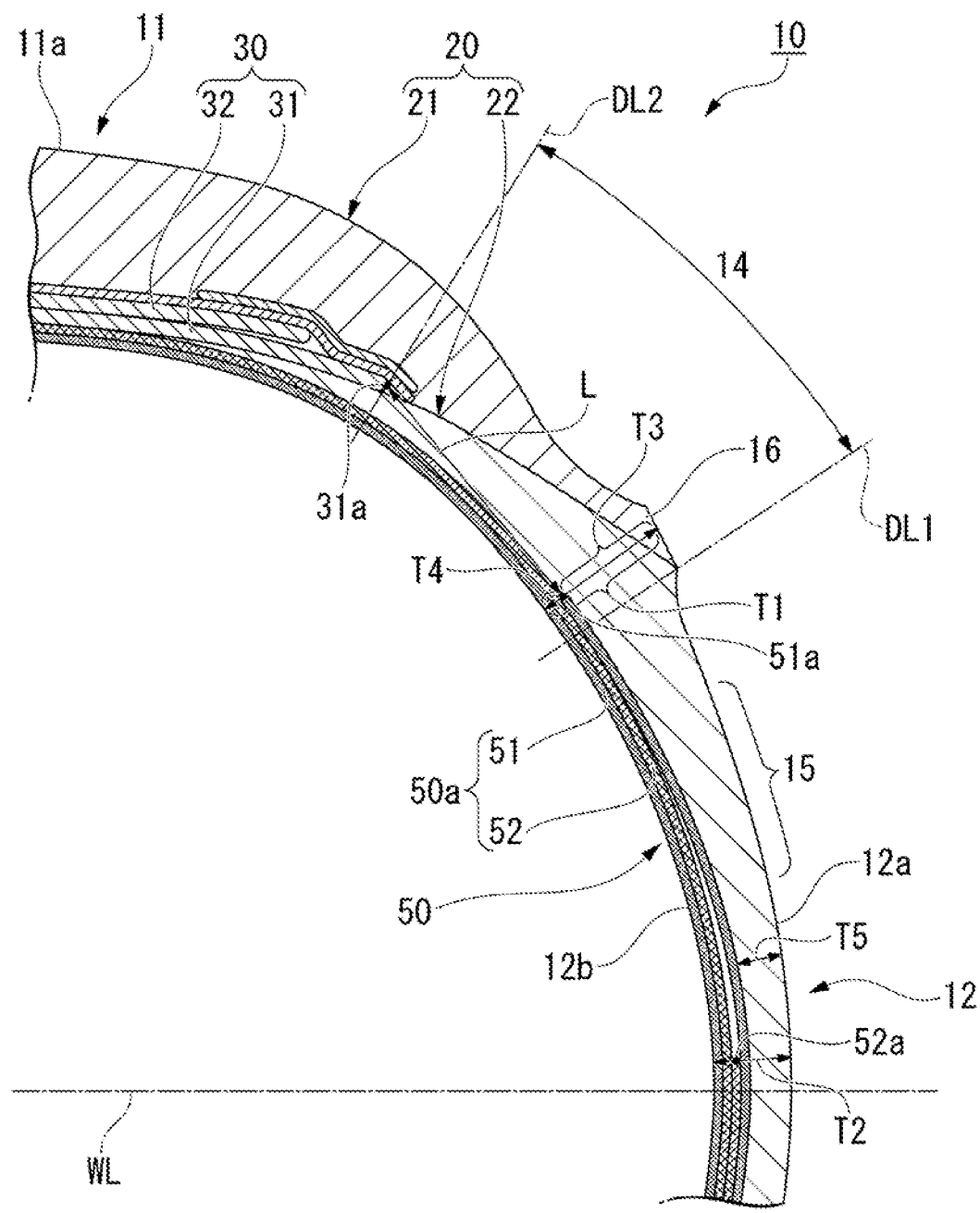
FIG. 2 is a cross-sectional view illustrating a portion of the tire of the present embodiment, and is a partially enlarged view of FIG. 1.

The belt ply 31 extends on both sides in the tire width direction more than the belt ply 32. As illustrated in FIG. 2, an end portion of the belt ply 31 in the tire width direction is a belt end portion 31a, which is the end portion of the belt layer 30 in the tire width direction. The belt end portion 31a is located to be separated inward in the tire width direction from the end portion of the tread rubber 21 in the tire width direction. The belt ply 32 is laminated on an outer side of the belt ply 31 in the tire radial direction.

As illustrated in FIG. 1, the belt reinforcing layer 40 is laminated on an outer side of the belt layer 30 in the tire radial direction. The belt reinforcing layer 40 is located between the tread surface portion 11a and the belt layer 30 in the tire radial direction. For example, the belt reinforcing layer 40 is formed by winding a composite cord obtained by twisting aromatic polyamide and nylon around an outer peripheral portion of the belt layer 30.

The carcass layer 50 has a plurality of laminated carcass plies 50a. In the present embodiment, the plurality of carcass plies 50a include two carcass plies, that is, a first carcass ply 51 and a second carcass ply 52. Each of the first carcass ply 51 and the second carcass ply 52 has an annular shape extending along the tire circumferential direction. The first carcass ply 51 and the second carcass ply 52 extend from the tread portion 11 to the pair of bead portions 13 via the pair of sidewall portions 12 and are folded outward around the bead core 60 in the tire width direction.

In a portion of the carcass layer 50 located at the tread portion 11, the first carcass ply 51 is located inside the second carcass ply 52 in the tire radial direction. In a portion of the carcass layer 50 extending from the tread portion 11 to the bead portion 13 via the sidewall portion 12, the first carcass ply 51 is located inside the second carcass ply 52 in the tire width direction. In a portion of the carcass layer 50 which is folded outward around the bead core 60 in the tire width direction, the first carcass ply 51 is located outside the second carcass ply 52 in the tire width direction.

In the present embodiment, an inner surface of the tire 10 is constituted by an inner surface of the first carcass ply 51. In the present embodiment, a thickness of the first carcass ply 51 is substantially uniform throughout. In the present embodiment, a thickness of the second carcass ply 52 is substantially uniform throughout. For example, the thickness of the first carcass ply 51 and the thickness of the second carcass ply 52 are the same.

As illustrated in FIG. 2, a first end portion Ma, which is a distal end portion of the portion of the first carcass ply 51 folded around the bead core 60, is located on an outside in the tire radial direction from a position WL where a dimension of the tire 10 in the tire width direction is maximum. The first end portion 51a is located outside in the tire radial direction from the portion of the second carcass ply 52 which is folded around the bead core 60. The first end portion 51a is in contact with an outside of a portion of the second carcass ply 52, which extends from the tread portion 11 to the bead portion 13 via the sidewall portion 12, in the tire width direction.

The first end portion 51a is located at a boundary portion 14 between the tread portion 11 and the sidewall portion 12. In the present embodiment, for example, the boundary portion 14 is a portion which is located in a region from an end portion of the tread rubber 21 in the tire width direction to the belt end portion 31a which is the end portion of the belt layer 30 in the tire width direction, in a region of the tire 10 in which the tread rubber 21 and the sidewall rubber 22 overlap in a tire thickness direction.

In the present specification, for example, the "tire thickness direction" is a normal direction orthogonal to the outer surface of the carcass layer 50. For example, a direction in which a dashed line DL1 illustrated in FIG. 2 extends is the tire thickness direction at the portion where the end portion of the tread rubber 21 in the tire width direction is located. The dashed line DL1 is orthogonal to the outer surface in the tire width direction of the folded portion of the first carcass ply 51, in the outer surface of the carcass layer 50. A direction in which a dashed line DL2 illustrated in FIG. 2 extends is the tire thickness direction at a portion where the belt end portion 31a is located. The dashed line DL2 is orthogonal to an outer surface in the tire radial direction of a portion of the second carcass ply 52 located at the tread portion 11, in the outer surface of the carcass layer 50. In the present embodiment, a portion of the tire 10 located in a region between the dashed line DL1 and the dashed line DL2 is the boundary portion 14.

In the present embodiment, a convex portion 16 protruding outward in the tire thickness direction is formed on an outer surface of the boundary portion 14. The outer surface of the boundary portion 14 is a portion of the outer surface of the tire 10 in the tire width direction. In the present embodiment, the convex portion 16 is formed at an end portion of the boundary portion 14 in the tire width direction. The convex portion 16 is constituted by an end portion of the tread rubber 21 in the tire width direction and an outer end portion of the sidewall rubber 22 in the tire width direction at an outer end portion of the sidewall rubber 32 in the tire radial direction. An inner end portion of the convex portion 16 in the tire radial direction is located inside the belt layer 30 in the tire radial direction. In the present embodiment, the entire convex portion 16 is located inside the belt layer 30 in the tire radial direction. In the present embodiment, the first end portion 51a of the first carcass ply 51 is disposed at a position where the first end portion 51a overlaps the convex portion 16 in the tire thickness direction.

The first end portion 51a and the belt end portion 31a of the belt layer 30 are disposed apart from each other. In the present embodiment, the first end portion 51a is disposed at a position separated from the belt end portion 31a inward in the tire radial direction and outward in the tire width direction. A distance L between the first end portion 51a and the belt end portion 31a is larger than a dimension T1 in the tire thickness direction at a portion of the tire 10 where the first end portion 51a is located. For example, the distance L is preferably 15 mm or more. This is because it is easy to suppress strain of the tire 10.

In the present embodiment, the first end portion 51a of the first carcass ply 51 is located outside in the tire radial direction from a strain region 15 of the sidewall portion 12 where the strain of the tire 10 tends to be larger than that of other portions when a force directed inwardly in the tire radial direction is applied to the tread surface portion 11a of the tread portion 11. The strain region 15 is a region including a portion where the strain is largest in the sidewall portion 12 and a portion near the portion where the strain is largest when the force directed inwardly in the tire radial direction is applied to the tread surface portion 11a. That is, in the present embodiment, the first end portion 51a is located outside in the tire radial direction from the portion of the sidewall portion 12 where the strain is largest when the force directed inwardly in the tire radial direction is applied to the tread surface portion 11a of the tread portion 11.

For example, the state in which the force directed inwardly in the tire radial direction is applied to the tread surface portion 11a of the tread portion 11 includes a state where a load is applied to the tire 10 mounted on a standard rim specified in "JATMA Year Book" and filled with the specified internal pressure and the tread surface portion 11a receives the force directed inwardly in the tire radial direction due to a normal force from the ground. In this case, for example, the load applied to the tire 10 includes the maximum load corresponding to the maximum load capacity of the tire 10. Further, for example, the strain of the sidewall portion 12 can be measured by attaching a strain gauge or the like to the sidewall portion 12.

In the following description, the portion of the sidewall portion 12 where the strain is largest when the force directed inwardly in the tire radial direction is applied to the tread surface portion 11a of the tread portion 11 is simply referred to as the "portion of the sidewall portion 12 where the strain is largest".

Further, the portion of the sidewall portion 12 where the strain is largest when the force directed inwardly in the tire radial direction is applied to the tread surface portion 11a of the tread portion 11 may be referred to as a "maximum deformation portion".

The strain region 15 is located inside in the tire radial direction from the boundary portion 14 between the tread portion 11 and the sidewall portion 12, and is located outside in the tire radial direction from a position WL where the dimension of the tire 10 in the tire width direction is maximum. For example, the strain region 15 is provided at the above-mentioned position when a dimension Z of the tread rubber 21 in the tire radial direction is 30% or less of a cross-sectional height SH of the tire 10.

The dimension Z of the tread rubber 21 in the tire radial direction is a distance in the tire radial direction from an inner end portion to an outer end portion of the tread rubber 21 in the tire radial direction. In the present embodiment, the inner end portion of the tread rubber 21 in the tire radial direction is an outer end portion of the tread rubber 21 in the tire width direction, and is a portion of the tread rubber 21 through which the dashed line DL1 passes in FIG. 2. In the present embodiment, the outer end portion of the tread rubber 21 in the tire radial direction is an outer end portion of the tread portion 11 in the tire radial direction, and is a portion of the tread surface portion 11a located at the tire equatorial section CL.

Further, the cross-sectional height SH is a distance along the tire radial direction between an inner end portion of the tire 10 in the tire radial direction and an outer end portion of the tread portion 11 in the tire radial direction in the vertical cross-sectional view as illustrated in FIG. 1. In the present embodiment, the inner end portion of the tire 10 in the tire radial direction is an inner end portion of the bead portion 13 in the tire radial direction.

The dimension T1 in the tire thickness direction of the tire 10 at the portion where the first end portion 51a of the first carcass ply 51 is located is larger than a dimension of the tire 10 in the thickness direction in a portion which is located outside in the tire radial direction from the position WL where the dimension of the tire 10 in the tire width direction is largest, and which is located inside in the tire radial direction from the first end portion 51a. The dimension of the tire 10 in the tire thickness direction increases from the position WL where the dimension of the tire 10 in the tire width direction becomes maximum toward the position of the first end portion 51a. In the present embodiment, for example, the tire 10 has a portion in which the dimension in the tire thickness direction of the tire 10 is larger than the dimension T1 in the tire thickness direction of the portion where the first end portion 51a is located, on the outside in the tire radial direction from the first end portion 51a.

In the portion of the tire 10 located outside in the tire radial direction from the position WL at which the dimension in the tire width direction is maximum, a dimension T5 in the tire thickness direction between the portion of the first carcass ply 51 folded around the bead core 60 and the outer surface 12a of the tire 10 in the tire width direction becomes largest between the first end portion 51a and the outer surface 12a of the tire 10. In other words, a dimension T3 in the tire thickness direction between the first end portion 51a and the outer surface 12a of the tire 10 is larger than the dimension in the tire thickness direction between a portion located inside the first end portion 51a in the tire radial direction and located outside in the tire radial direction from the position WL where the dimension in the tire width direction is maximum in the portion of the first carcass ply 51 folded around the bead core 60, and the outer surface 12a of the tire 10 in the tire width direction. The dimension T5 increases from the position WL where the dimension in the tire width direction is maximum toward the first end portion 51a, and becomes the maximum dimension T3 at the first end portion 51a.

The dimension T3 between the first end portion 51a and the outer surface 12a of the tire 10 is larger than a dimension T4 in the tire thickness direction between the first end portion 51a and the inner surface 12b of the tire 10 in the tire width direction. For example, the dimension T3 between the first end portion 51a and the outer surface 12a of the tire 10 is three times or more the dimension T4 between the first end portion 51a and the inner surface 12b of the tire 10. In the present embodiment, the outer surface 12a of the tire 10 is an outer surface of the sidewall rubber 22 in the tire width direction. In the present embodiment, the inner surface 12b of the tire 10 is an inner surface of the carcass layer 50 in the tire width direction.

More specifically, the dimension T5 is a dimension in the tire thickness direction between an outer surface in the tire width direction in the portion of the first carcass ply 51 folded around the bead core 60 and the outer surface 12a of the tire 10 in the tire width direction. Further, more specifically, the dimension T3 is a dimension in the tire thickness direction between the outer surface of the first end portion 51a in the tire width direction and the outer surface 12a of the tire 10 in the tire width direction. Further, more specifically, the dimension T4 is a dimension in the tire thickness direction between the inner surface of the first end portion 51a in the tire width direction and the inner surface 12b of the tire 10 in the tire width direction.

A second end portion 52a, which is a distal end portion of a portion of the second carcass ply 52 folded around the bead core 60, is located outside in the tire radial direction from the position WL where the dimension of the tire 10 in the tire width direction is maximum. In the present embodiment, the second end portion 52a is located inside the strain region 15 in the tire radial direction. That is, the second end portion 52a is located inside in the tire radial direction from the portion of the sidewall portion 12 having the largest strain. The second end portion 52a is located inside the first end portion 51a in the tire radial direction. That is, the first end portion 51a is located outside the second end portion 52a in the tire radial direction, and the first carcass ply 51 has the folded portion longer than that of the second carcass ply 52.

For example, a distance H1 in the tire radial direction between the inner end portion of the tire 10 in the tire radial direction and the first end portion 51a is 65% or more and 75% or less of the cross-sectional height SH of the tire 10. For example, a distance H2 in the tire radial direction between the inner end portion of the tire 10 in the tire radial direction and the second end portion 52a is 45% or more and 55% or less of the cross-sectional height SH.

The dimension T1 of the tire 10 in the tire thickness direction in the portion where the first end portion 51a is located is larger than the dimension T2 of the tire 10 in the tire thickness direction in the portion where the second end portion 52a is located, and is two times or less the dimension T2. In the present embodiment, the dimension T1 of the tire 10 in the tire thickness direction in the portion where the first end portion 51a is located and the dimension T2 of the tire 10 in the tire thickness direction in the portion where the second end portion 52a is located satisfy T1:T2=7:4.

According to the present embodiment, the first end portion 51a of the first carcass ply 51 is located at the boundary portion 14 between the tread portion 11 and the sidewall portion 12. Therefore, the portion of the first carcass ply 51 folded around the bead core 60 can be suitably extended to the portion of the sidewall portion 12 that is closer to the outside in the tire radial direction. As a result, the number of carcass plies 50a laminated in the tire width direction can increase in the portion of the sidewall portion 12 that is closer to the outside in the tire radial direction. Specifically, in the present embodiment, the second carcass ply 52 is sandwiched by the folded first carcass ply 51 at the portion of the sidewall portion 12 closer to outside in the tire radial direction, and the carcass ply 50a is laminated in three layers. Therefore, strength of the sidewall portion 12 can be suitably improved by the plurality of carcass plies 50a provided in the carcass layer 50, and it is possible to suppress occurrence of side cut.

Further, according to the present embodiment, in the portion located outside in the tire radial direction from the position WL where the dimension in the tire width direction is maximum, the dimension T5 in the tire thickness direction between the portion of the first carcass ply 51 folded around the bead core 60 and the outer surface 12a of the tire 10 is maximum between the first end portion 51a and the outer surface 12a. Therefore, the portion of the tire 10 located outside the first end portion 51a in the tire thickness direction can be suitably thickened, and the tire 10 can be made less likely to be distorted at the portion where the first end portion 51a is located. Further, generally, in the tire 10, in most cases, the boundary portion 14 between the tread portion 11 and the sidewall portion 12 is located outside in the tire radial direction from the strain region 15 of the sidewall portion 12 in which the strain tends to be larger. Therefore, by disposing the first end portion 51a at the boundary portion 14, it is easy to avoid disposing the first end portion 51a in the portion of the sidewall portion 12 that is easily distorted, and it is easy to suppress the increase in the strain of the tire 10. As a result, it is possible to suppress an increase in the strain of the tire 10 when the vehicle travels, and it is possible to suppress a decrease in the durability of the tire 10.

As described above, according to the tire 10 of the present embodiment, it is possible to suppress the decrease in the durability while suppressing the occurrence of the side cut.

Further, according to the present embodiment, the first end portion 51a is located outside in the tire radial direction from the portion of the sidewall portion 12 having the largest strain. Therefore, the first end portion 51a is disposed so as to avoid the portion of the sidewall portion 12 that is easily distorted. As a result, it is possible to further suppress an increase in the strain of the tire 10 and further suppress the decrease in the durability of the tire 10.

Further, for example, in the belt end portion 31a, stress is likely to be concentrated and the tire 10 is likely to be distorted. Therefore, when the first end portion 51a of the first carcass ply 51 is close to the belt end portion 31a, the strain of the tire 10 tends to increase. On the other hand, according to the present embodiment, the first end portion 51a is disposed apart from the belt end portion 31a which is the end portion of the belt layer 30 in the tire width direction, and the distance L between the first end portion 51*a* and the belt end portion 31*a* is larger than the dimension T1 in the tire thickness direction of the tire 10 at the portion where the first end portion 51*a* is located. Therefore, the distance L can be suitably increased, and thus, the first end portion 51*a* can be suitably separated from the belt end portion 31*a*. As a result, it is possible to suppress the increase in the strain of the tire 10, and it is possible to further suppress the decrease in the durability of the tire 10. Specifically, in the present embodiment, the distance L can be easily set to be 15 mm or more, it is possible to suitably suppress the increase in the strain of the tire 10, and it is possible to suitably suppress the decrease in the durability of the tire 10.

Further, according to the present embodiment, the first end portion 51*a* of the first carcass ply 51 is disposed apart outward from the belt end portion 31*a* in the tire width direction. Therefore, for example, the portion of the first carcass ply 51 that is folded around the bead core 60 can be shortened as compared with a case where the first end portion 51*a* is disposed inward from the belt end portion 31*a* in the tire width direction. As a result, a material required for manufacturing the carcass layer 50 can be reduced, and a weight of the carcass layer 50 can be reduced. Therefore, a manufacturing cost of the tire 10 can be reduced, and a weight of the tire 10 can be reduced.

Further, according to the present embodiment, the first end portion 51*a* is disposed at the position where the first end portion 51*a* overlaps the convex portion 16 in the tire thickness direction. Therefore, the dimension T3 in the tire thickness direction between the first end portion 51*a* and the outer surface 12*a* of the tire 10 can be increased. As a result, it is possible to further suppress the strain of the tire 10 at the position of the first end portion 51*a*, and it is possible to further suppress the decrease in the durability of the tire 10.

Further, according to the present embodiment, the inner end portion of the convex portion 16 in the tire radial direction is located inside the belt layer 30 in the tire radial direction. Therefore, by disposing the first end portion 51*a* at the convex portion 16, the first end portion 51*a* can be disposed away from the belt end portion 31*a*. Therefore, it is possible to suppress the increase in the strain of the tire 10 and further suppress the decrease in the durability of the tire 10.

Further, according to the present embodiment, the second end portion 52*a* of the second carcass ply 52 laminated on the first carcass ply 51 is located outside in the tire radial direction from the position WL where the dimension in the tire width direction is maximum. Therefore, the position of the second end portion 52*a* can be set more outward in the tire radial direction, and thus, the strength of the sidewall portion 12 can be further improved. As a result, it is possible to further suppress the occurrence of the side cut.

Further, according to the present embodiment, the second end portion 52*a* is located inside in the tire radial direction from the portion of the sidewall portion 12 having the largest strain. Therefore, the second end portion 52*a* is disposed so as to avoid the portion of the sidewall portion 12 that is easily distorted. As a result, it is possible to suppress the decrease in the durability of the tire 10 while further suppressing the occurrence of the side cut due to the second carcass ply 52.

Further, according to the present embodiment, in the portion folded outward in the tire width direction around the bead core 60, the first carcass ply 51 is located outside the second carcass ply 52 in the tire width direction and the first end portion 51*a* is located outside the second end portion 52*a* in the tire radial direction. Therefore, the portion of the first carcass ply 51 that is folded around the bead core 60 can cover the second end portion 52*a* of the second carcass ply 52 from outside in the tire width direction. As a result, stress can be less likely to be concentrated on the second end portion 52*a* as compared with a case where the second end portion 52*a* is not covered. Therefore, it is possible to suppress the strain of the tire 10 at the second end portion 52*a*. In addition, the strength of the tire 10 can be easily improved, and it is possible to suppress the occurrence of the side cut.

Further, according to the present embodiment, when the dimension of the tire 10 in the tire thickness direction in the portion where the first end portion 51*a* is located is defined as T1 and the dimension of the tire 10 in the tire thickness direction in the portion where the second end portion 52*a* is located is defined as T2, the relationship of T1:T2=7:4 is satisfied. By having the dimensions T1 and T2 in the relationship, it is possible to relatively decrease the dimension T1 of the tire 10 in the tire thickness direction in the portion where the first end portion 51*a* is located while maintaining the effect of suppressing the side cut and the effect of suppressing the decrease in the durability. As a result, the sidewall portion 12 can be made relatively thin, and a material required for manufacturing the sidewall portion 12 can be reduced. Therefore, the manufacturing cost of the tire 10 can be reduced. Moreover, the weight of the tire 10 can be reduced. Further, since the sidewall portion 12 can be made relatively thin, a rolling resistance can be reduced. As described above, according to the present embodiment, since the strength of the sidewall portion 12 can be improved as described above, even when the sidewall portion 12 is made relatively thin, it is possible to suppress the decrease in the durability of the tire 10 while suppressing the occurrence of the side cut.

Further, according to the present embodiment, the distance H2 in the tire radial direction between the inner end portion of the tire 10 in the tire radial direction and the second end portion 52*a* of the tire 10 is 45% or more and 55% or less of the cross-sectional height SH.

By setting the distance H2 to the numerical range, the second end portion 52*a* can be suitably disposed outside in the tire radial direction while avoiding the portion of the sidewall portion 12 where the strain is largest in the inside in the tire radial direction. As a result, it is possible to further suppress the decrease in the durability of the tire 10 while further suppressing the occurrence of the side cut.

Further, according to the present embodiment, the distance H1 in the tire radial direction between the inner end portion in the tire radial direction of the tire 10 and the first end portion 51*a* is 65% or more and 75% or less of the cross-sectional height SH.

By setting the distance H1 to the numerical range, the first end portion 51*a* can be suitably disposed outside in the tire radial direction while avoiding the portion of the sidewall portion 12 where the strain is largest in the outside in the tire radial direction. As a result, it is possible to further suppress the decrease in the durability of the tire 10 while further suppressing the occurrence of the side cut.

In the above-described embodiment, the following configuration can also be adopted.

The first end portion 51*a* of the first carcass ply 51 is located at the boundary portion 14, and the position of the first end portion 51*a* is particularly not limited as long as the first end portion 51*a* is located at the position at which, the position is in the portion located outside in the tire radial direction from the position WL at which the dimension in the tire width direction is maximum, and at which the dimension T5 in the tire thickness direction between the portion of the first carcass ply 51 folded around the bead core 60 and the outer surface 12a in the tire width direction is maximum. The first end portion 51a may be disposed at a position where the first end portion 51a does not overlap the convex portion 16 in the tire thickness direction. The convex portion 16 may not be provided.

When the first carcass ply 51 having the first end portion 51a is provided, the position of the second end portion 52a of the second carcass ply 52 is not particularly limited. The second end portion 52a may be located inside in the tire radial direction from the position WL where the dimension in the tire width direction is maximum. Further, the second end portion 52a may be located at the boundary portion 14.

The carcass layer 50 may have three or more carcass plies 50a. Further, the plurality of carcass ply 50a may include another carcass ply 50a of which a distal end portion is disposed at the same tire radial position as the first end portion 51a of the first carcass ply 51. Further, the first carcass ply 51 and the second carcass ply 52 may be laminated in a reverse order. That is, the first carcass ply 51 may be located inside the second carcass ply 52 in the tire width direction in the portion folded outward in the tire width direction around the bead core 60. The carcass layer 50 may have an inner liner attached to the inner surface of a plurality of laminated carcass plies 50a.

The tire 10 may be used in any vehicle.

The configurations described in the present specification can be appropriately combined within a range that does not contradict each other.

According to one aspect of the tire of the present invention, the first end portion of the first carcass ply is located at the boundary portion between the tread portion and the sidewall portion. Therefore, the portion of the first carcass ply folded around the bead core can be suitably extended to the portion of the sidewall portion that is closer to the outside in the tire radial direction. As a result, the number of carcass plies overlapping in the tire width direction can increase in the portion of the sidewall portion that is closer to the outside in the tire radial direction. Therefore, the strength of the sidewall portion can be suitably improved by the plurality of carcass plies provided in the carcass layer, and the occurrence of the side cut can be suppressed.

Further, according to one aspect of the tire of the present invention, in the portion located outside in the tire radial direction from the position where the dimension in the tire width direction is maximum, the dimension in the tire thickness direction between the portion of the first carcass ply folded around the bead core and the outer surface of the tire is the maximum between the first end portion and the outer surface of the tire. Therefore, the portion of the tire located outside the first end portion in the tire thickness direction can be suitably thickened, and the tire can be made less likely to be distorted at the portion where the first end portion is located. Further, generally, in a tire, in most cases, the boundary portion between the tread portion and the sidewall portion is located on the outside in the tire radial direction from the strain region of the sidewall portion in which the strain tends to be larger. Therefore, by disposing the first end portion at the boundary portion, it is easy to avoid disposing the first end portion in the portion of the sidewall portion that is easily distorted, and it is easy to suppress the increase in the strain of the tire. As a result, it is possible to suppress the increase in the strain of the tire when the vehicle travels, and it is possible to suppress the decrease in the durability of the tire.

As described above, according to one aspect of the tire of the present invention, it is possible to suppress the decrease in the durability of the tire while suppressing the occurrence of the side cut.

The first end portion may be located outside in the tire radial direction from the portion of the sidewall portion where the strain is largest when the force directed inwardly in the tire radial direction is applied to the tread surface portion of the tread portion.

According to this configuration, the first end portion of the first carcass ply is disposed so as to avoid the portion of the sidewall portion that is easily distorted. As a result, it is possible to further suppress the increase in the strain of the tire and further suppress the decrease in the durability of the tire.

The belt layer located between the tread surface portion of the tread portion and the carcass layer in the tire radial direction is embedded in the tread portion, the first end portion and the belt end portion which is the end portion of the belt layer in the tire width direction are disposed apart from each other, and the distance between the first end portion and the belt end portion may be larger than the dimension in the tire thickness direction in the portion where the first end portion is located.

According to this configuration, the distance between the first end portion of the first carcass ply and the belt end portion can be suitably increased, and the first end portion can be suitably separated from the belt end portion. As a result, it is possible to suppress the increase in the strain of the tire, and it is possible to further suppress the decrease in the durability of the tire.

The convex portion may be formed on the outer surface of the boundary portion, and the first end portion may be disposed at the position where the first end portion overlaps the convex portion in the tire thickness direction.

According to this configuration, the dimension in the tire thickness direction between the first end portion and the outer surface of the tire can be increased. Accordingly, it is possible to further suppress the strain of the tire at the position of the first end portion, and it is possible to further suppress the decrease in the durability of the tire.

The plurality of carcass plies may include the second carcass ply laminated on the first carcass ply and the second carcass ply may extend from the tread portion to the pair of bead portions via the pair of sidewall portions and may be folded outward around the bead core in the tire width direction. Moreover, the second end portion, which is the distal end portion of a portion of the second carcass ply folded around the bead core, is located outside the position, at which the dimension of the tire in the tire width direction is maximum, in the tire radial direction.

According to this configuration, the position of the second end portion of the second carcass ply can be set more outward in the tire radial direction, and thus, the strength of the sidewall portion can be further improved. As a result, it is possible to further suppress the occurrence of the side cut.

The second end portion may be located inside in the tire radial direction from the portion of the sidewall portion where the strain is largest when the force directed inwardly in the tire radial direction is applied to the tread surface portion of the tread portion.

According to this configuration, the second end portion is disposed so as to avoid the portion of the sidewall portion that is easily distorted. As a result, it is possible to suppress the decrease in the durability of the tire while further suppressing the occurrence of the side cut due to the second carcass ply.

In the portion folded outward in the tire width direction around the bead core, the first carcass ply may be located outside the second carcass ply in the tire width direction, and the first end portion may be located outside the second end portion in the tire radial direction.

According to this configuration, the portion of the first carcass ply that is folded around the bead core can cover the second end portion of the second carcass ply from outside in the tire width direction. As a result, stress can be less likely to be concentrated on the second end portion as compared with the case where the second end portion is not covered. Therefore, it is possible to suppress the strain of the tire at the second end portion. In addition, the strength of the tire can be easily improved, and it is possible to further suppress the occurrence of the side cut.

When the dimension of the tire in the tire thickness direction in the portion where the first end portion is located is defined as T1 and the dimension of the tire in the tire thickness direction in the portion where the second end portion is located is defined as T2, the relationship of T1:T2=7:4 is satisfied.

By having the dimensions T1 and T2 in the relationship, it is possible to relatively decrease the dimension T1 of the tire in the tire thickness direction in the portion where the first end portion is located while maintaining the effect of suppressing the side cut and the effect of suppressing the decrease in the durability. As a result, the sidewall portion can be made relatively thin, and the material required for manufacturing the sidewall portion can be reduced. Therefore, the manufacturing cost of the tire can be reduced. In addition, the weight of the tire can be reduced. In addition, since the sidewall portion can be made relatively thin, a rolling resistance can be reduced. In this way, since the strength of the sidewall portion can be improved as described above, even when the sidewall portion is made relatively thin, it is possible to suppress the decrease in the durability of tire while suppressing the occurrence of the side cut.

The distance in the tire radial direction between the inner end portion of the tire in the tire radial direction and the second end portion is 45% or more and 55% or less of the cross-sectional height.

By setting the distance in the tire radial direction between the inner end portion of the tire in the tire radial direction and the second end portion of the tire to the numerical range, the second end portion can be suitably disposed outside in the tire radial direction while avoiding the portion of the sidewall portion where the strain is largest in the inside in the tire radial direction. As a result, it is possible to further suppress the decrease in the durability of the tire while further suppressing the occurrence of the side cut.

The distance in the tire radial direction between the inner end portion of the tire in the tire radial direction and the first end portion is 65% or more and 75% or less of the cross-sectional height.

By setting the distance in the tire radial direction between the inner end portion of the tire in the tire radial direction and the first end portion to the numerical range, the first end portion can be suitably disposed outside in the tire radial direction while avoiding the portion of the sidewall portion where the strain is largest in the outside in the tire radial direction. As a result, it is possible to further suppress the decrease in the durability of the tire while further suppressing the occurrence of the side cut.

INDUSTRIAL APPLICABILITY

By applying the tire of the present invention to the present field, it is possible to provide a tire having a structure capable of suppressing a decrease in durability while suppressing occurrence of side cut.

REFERENCE SIGNS LIST

10: Tire
11: Tread portion
11a: Tread surface portion
12: Sidewall portion
12a: Outer surface
13: Bead portion
14: Boundary portion
16: Convex portion
30: Belt layer
31a: Belt end portion
50: Carcass layer
50a: Carcass ply
51: First carcass ply
51a: First end portion
52: Second carcass ply
52a: Second end portion
60: Bead core
SH: Cross-sectional height

The invention claimed is:

1. A tire comprising:
a carcass layer which is provided across a tread portion, a pair of sidewall portions, and a pair of bead portions,
wherein the carcass layer has a plurality of laminated carcass plies,
the plurality of carcass plies include a first carcass ply which extend from the tread portion to the pair of bead portions via the pair of sidewall portions and is folded outward in a tire width direction around a bead core embedded in the bead portion,
a first end portion, which is a distal end portion of a portion of the first carcass ply folded around the bead core, is located outside in a tire radial direction from a position where a dimension in the tire width direction is maximum, and is located at a boundary portion between the tread portion and the sidewall portion, and
in a portion located outside in the tire radial direction from the position where the dimension in the tire width direction is maximum, a dimension in a tire thickness direction between the portion of the first carcass ply folded around the bead core and an outer surface of the tire in the tire width direction is maximum between the first end portion and the outer surface of the tire in the tire width direction,
where the plurality of carcass plies include a second carcass ply laminated on the first carcass ply,
the second carcass ply extends from the tread portion to the pair of bead portions via the pair of sidewall portions and is folded outward in the tire width direction around the bead core, and
a second end portion, which is a distal end portion of a portion of the second carcass ply folded around the bead core, is located outside in the tire radial direction from a position where a dimension in the tire width direction is maximum,
wherein when a dimension in the tire thickness direction at a portion where the first end portion is located is defined as T1, and
a dimension in the tire thickness direction at a portion where the second end portion is located is defined as T2,
a relationship of T1:T2=7:4 is satisfied.

2. The tire according to claim 1,
wherein a distance in the tire radial direction between an inner end portion of the tire in the tire radial direction and the first end portion is 65% or more and 75% or less of a cross-sectional height.

3. The tire according to claim 1,
wherein a belt layer located between a tread surface portion of the tread portion and the carcass layer in the tire radial direction is embedded in the tread portion,
the first end portion and a belt end portion, which is an end portion in the tire width direction in the belt layer, are disposed apart from each other, and
a distance between the first end portion and the belt end portion is larger than a dimension in the tire thickness direction in a portion where the first end portion is located.

4. The tire according to claim 1,
wherein a convex portion is formed on an outer surface of the boundary portion, and
the first end portion is disposed at a position where the first end portion overlaps the convex portion in the tire thickness direction.

5. The tire according to claim 1,
wherein in the portion folded outward in the tire width direction around the bead core, the first carcass ply is located outside in the tire width direction from the second carcass ply, and
the first end portion is located outside in the tire radial direction from the second end portion.

6. The tire according to claim 1,
wherein the first end portion is located on an outside in the tire radial direction from a portion of the sidewall portion where strain is largest when a force directed inwardly in the tire radial direction is applied to a tread surface portion of the tread portion.

7. The tire according to claim 1,
wherein the second end portion is located inside in the tire radial direction from a portion of the sidewall portion where a strain is largest when a force directed inwardly in the tire radial direction is applied to a tread surface portion of the tread portion.

8. A tire comprising:
a carcass layer which is provided across a tread portion, a pair of sidewall portions, and a pair of bead portions,
wherein the carcass layer has a plurality of laminated carcass plies,
the plurality of carcass plies include a first carcass ply which extend from the tread portion to the pair of bead portions via the pair of sidewall portions and is folded outward in a tire width direction around a bead core embedded in the bead portion,
a first end portion, which is a distal end portion of a portion of the first carcass ply folded around the bead core, is located outside in a tire radial direction from a position where a dimension in the tire width direction is maximum, and is located at a boundary portion between the tread portion and the sidewall portion, and
in a portion located outside in the tire radial direction from the position where the dimension in the tire width direction is maximum, a dimension in a tire thickness direction between the portion of the first carcass ply folded around the bead core and an outer surface of the tire in the tire width direction is maximum between the first end portion and the outer surface of the tire in the tire width direction,
where the plurality of carcass plies include a second carcass ply laminated on the first carcass ply,
the second carcass ply extends from the tread portion to the pair of bead portions via the pair of sidewall portions and is folded outward in the tire width direction around the bead core, and
a second end portion, which is a distal end portion of a portion of the second carcass ply folded around the bead core, is located outside in the tire radial direction from a position where a dimension in the tire width direction is maximum,
wherein a distance in the tire radial direction between an inner end portion of the tire in the tire radial direction and the second end portion is 45% or more and 55% or less of a cross-sectional height.

9. The tire according to claim 8,
wherein a distance in the tire radial direction between an inner end portion of the tire in the tire radial direction and the first end portion is 65% or more and 75% or less of a cross-sectional height.

10. The tire according to claim 8,
wherein a convex portion is formed on an outer surface of the boundary portion, and
the first end portion is disposed at a position where the first end portion overlaps the convex portion in the tire thickness direction.

11. The tire according to claim 8,
wherein the first end portion is located on an outside in the tire radial direction from a portion of the sidewall portion where strain is largest when a force directed inwardly in the tire radial direction is applied to a tread surface portion of the tread portion.

12. The tire according to claim 8,
wherein a belt layer located between a tread surface portion of the tread portion and the carcass layer in the tire radial direction is embedded in the tread portion,
the first end portion and a belt end portion, which is an end portion in the tire width direction in the belt layer, are disposed apart from each other, and
a distance between the first end portion and the belt end portion is larger than a dimension in the tire thickness direction in a portion where the first end portion is located.

13. The tire according to claim 8,
wherein the second end portion is located inside in the tire radial direction from a portion of the sidewall portion where a strain is largest when a force directed inwardly in the tire radial direction is applied to a tread surface portion of the tread portion.

14. The tire according to claim 8,
wherein in the portion folded outward in the tire width direction around the bead core, the first carcass ply is located outside in the tire width direction from the second carcass ply, and
the first end portion is located outside in the tire radial direction from the second end portion.

* * * * *